Figure 1:
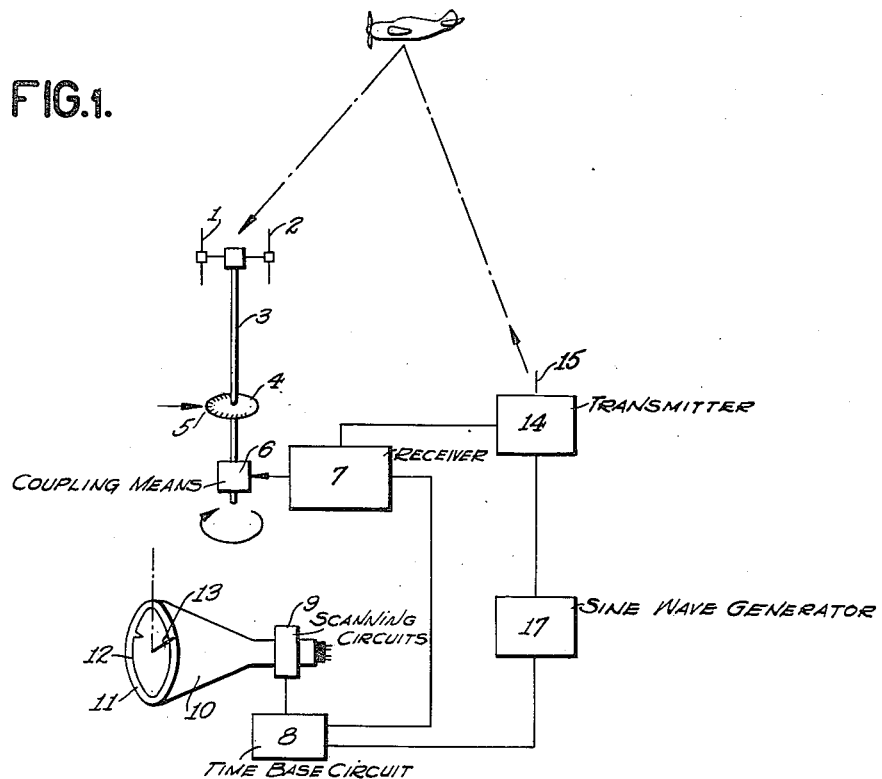

March 18, 1952          R. J. HARDY          2,589,249

DIRECTION AND DISTANCE FINDING EQUIPMENT

Filed March 7, 1941          2 SHEETS—SHEET 1

INVENTOR.
RENE J. HARDY
BY
ATTORNEY.

March 18, 1952  R. J. HARDY  2,589,249
DIRECTION AND DISTANCE FINDING EQUIPMENT
Filed March 7, 1941  2 SHEETS—SHEET 2
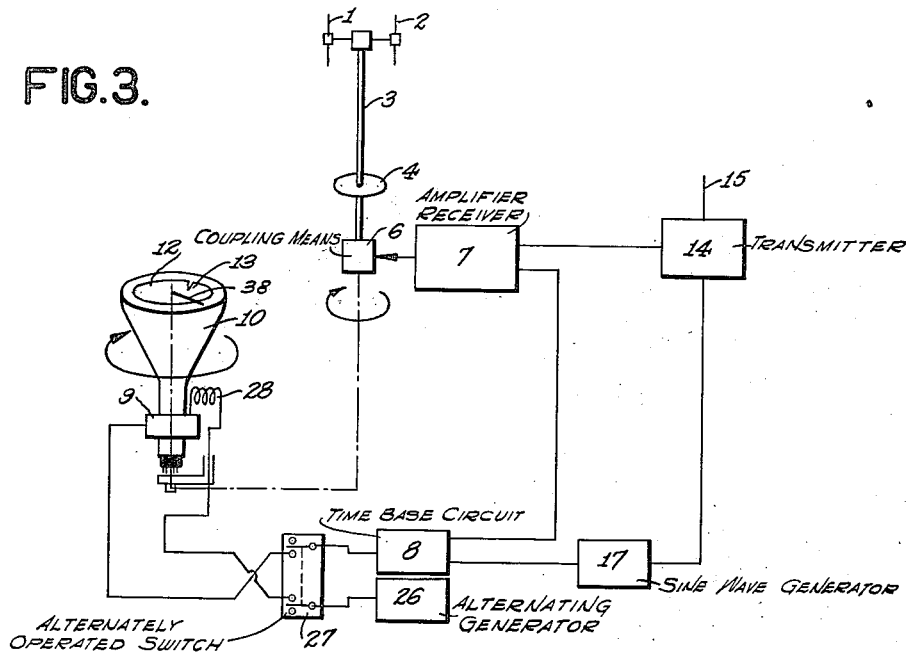
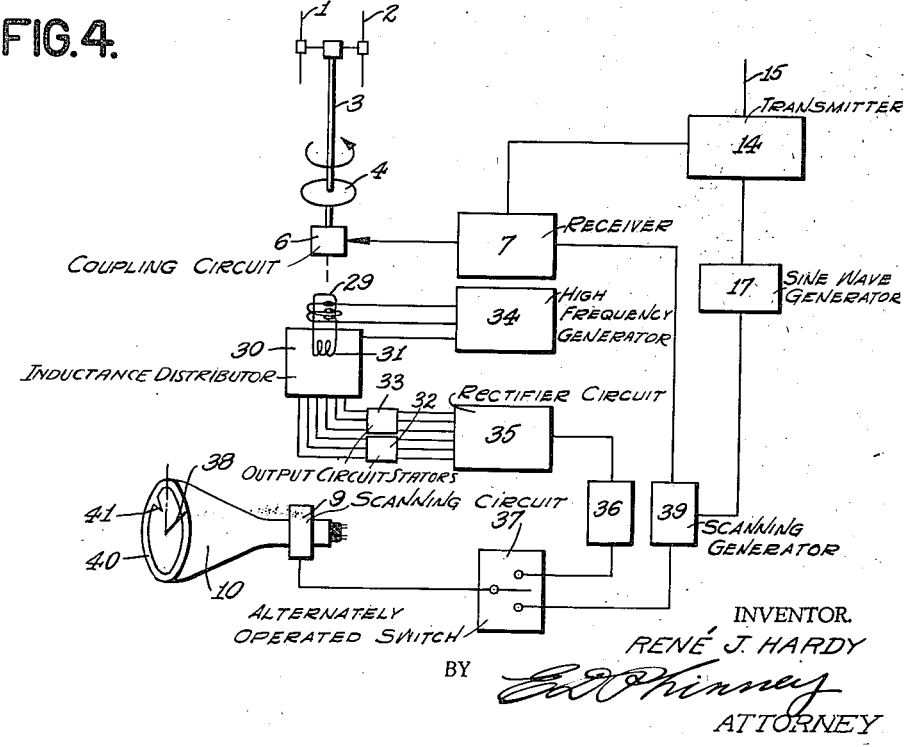
INVENTOR.
RENÉ J. HARDY Patented Mar. 18, 1952

2,589,249

UNITED STATES PATENT OFFICE 2,589,249

DIRECTION AND DISTANCE FINDING EQUIPMENT

René Jean Hardy, Lyon, France, assignor to International Standard Electric Corporation, New York, N. Y.

Application March 7, 1941, Serial No. 382,151

3 Claims. (Cl. 343—11)

The present invention relates to radio direction and distance finding equipments and more particularly to such finder equipments adapted to give substantially instantaneous and simultaneous indications of direction and distance of different obstacles in the surrounding space, such as for example of airplanes flying around a landing field.

The invention has mainly amongst its objects to provide distance and direction finding equipments in which instantaneous and simultaneous indications of distances are given on an indicator without inertia such as a cathode ray oscillograph whilst giving by a quick operation of a radiogoniometric arrangement indications of the directions corresponding to these distance indications.

It is well known in such arrangements of direction and (or) distance finding to provide a radio pulse transmitter which transmits a series of short pulses and a pulse receiver which receives the pulses reflected back by obstacles existing in the neighbourhood of the transmitting-receiving equipment.

Another object of the invention is to provide improved obstacle locating arrangements giving both distance and direction indications and making use of such pulse radio apparatus.

Another object of the invention is to provide improved obstacle locating arrangements giving both distance and direction indications on the same indicator and at the location of the radio apparatus and (or) simultaneously at one or more distant points.

According to some features of the invention, a direction and distance finding equipment comprises a radio pulse generating and transmitting arrangement, a manually rotatable wave collector, a pulse receiving arrangement so provided as to receive and amplify pulses which are reflected back by obstacles located in the electro-magnetic field of the transmitter, means for obtaining simultaneous indications of distances of said obstacles on an indicator such as a cathode ray oscillograph, and means for obtaining an indication of direction corresponding respectively to each indication of distance obtained on the indicator, said last means giving an indication of direction each time a distance indication is made to disappear on said indicator in accordance with the rotation of said wave collector.

According to another feature of the invention, in such distance and direction finding equipments, means are provided for obtaining an alternative or supplementary indication of direction on the distance indicator itself each time indication of distance is made to disappear on said indicator for a position of zero reception of said wave collector.

Figure 2:
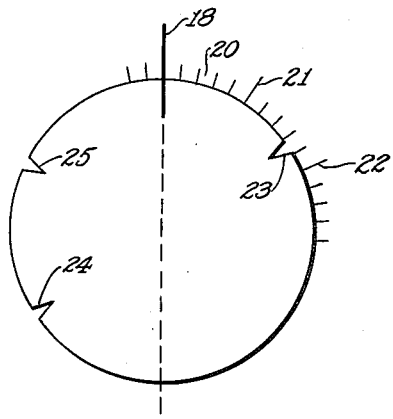

These objects and features, as well as others, will now be described in relation to the attached drawings, in which:

Figure 1 schematically shows an example of distance and direction finding equipment embodying some features of the invention;

Figure 2 shows an example of simultaneous indications of distances as obtained with the system of Figure 1; and, Figures 3 and 4 schematically show two other examples of radio finding equipments embodying features of the invention.

Referring now to Figure 1, the wave collectors 1, 2 are mounted for rotation round an axis 3 by means of scaled dial 4 which is manually rotated with respect to a fixed index 5. The collector system utilised is of a type amongst those well known for radiogoniometry purposes on short and ultra-short wave-lengths, and the two dipoles 1 and 2 are connected by a coupling circuit 6 of any known type, with or without mechanical contact, to an amplifier receiver 7. The output circuit of receiver 7 energises in the well known manner of radial modulation the base circuit time 8 of the scanning of a cathode ray tube 10 said time base circuit producing rotation of the cathode ray beam. The scanning circuits 9 may be either of the induction or of the electrostatic plate type, or of any other suitable kind. The circular time base 8 uses a sinusoidal voltage generated by a generator 17 and the diameter of the circle 12 created on the screen 11 of said cathode ray tube 10 is for instance function of the plate current of the output valve of receiver 7.

A pulse transmitter 14 radiates through its antenna 15 a series of short wave trains according to known methods, each short wave train corresponding to the passage to zero of the sinusoidal voltage of generator 17, i. e. by a suitable process, it is for instance possible to detect or rectify the sinusoidal voltage used for creating the circular scanning and utilise this detected sinusoidal voltage for generating the pulse which will control the transmission of said short wave trains in synchronism with the passage to the vertical for instance of the scanning spot on circle 12.

Then, the reflected wave train is picked up by the wave collectors 1, 2 and passed to the receiver 7 which gives a quick radial deflection creating a trace such as 13 on the fluorescent screen 11 having an angle with the vertical line which depends on the distance of the obstacle. If more than one obstacle is located in the surrounding space, several indications such as shown by the radial modulation marks 23, 24, 25 ... in Figure 2 will be obtained on the screen 11, these indications corresponding to the number of distances at which are situated said obstacles. Although these indications appear in succession on the screen, an observer will see all of them simultaneously by reason of the persistence of the fluorescent screen.

As the directional diagram of the wave collectors 1, 2 is provided rotatable, then by manual orientation of said collectors, a position of zero reception will be found for each obstacle, as indicated by the disappearance on the screen of the corresponding indications 23 to 25, and this position of zero reception, read on the graduated dial 4 in front of the index 5, will give the direction of the corresponding obstacle, as in radiogoniometering apparatus. By successive rotation of the wave collectors 1, 2 and consequently of the scaled dial 4, the directions of all obstacles indicated by the distance indicator will successively be obtained.

Another arrangement embodying features of the invention is shown in Figure 3, in which, in order to eliminate the necessity of reading the direction on a scaled dial more or less distant from the cathode ray tube, or to enable a distant indicator to be used, as will be described later in more details, means is provided for enabling the obtaining of both the distance and the direction indications on the same oscillograph screen. In the arrangement shown in Figure 3, the cathode ray tube 10 is supplied with deflecting currents or voltages from the time base circuit 8 in an intermittent way, for instance by the deflecting coil 28 and the alternating generator 26. A switch 27, which may be of the electronic or mechanical type or of any other suitable kind, is so positioned and operated as to alternate at a relatively high speed the angular direction indication and the distance indication for an obstacle, the frequency of this switching being chosen sufficiently high for ensuring a good light persistence of these simultaneous indications.

The oscillator 26 is provided so that, when feeding the deflection coil 28 giving the direction indications, the spot on the screen of the oscillograph will give a radial indication such as 38 instead of remaining at a fixed radius in a determined angular position as defined by the deflecting coil 28. This oscillator 26 gives to the spot a radial deflection by varying the current through coil 28. A scale calibrated in angular degrees is provided on the screen of the cathode ray tube for giving a direct reading of the required direction.

When the circular time base circuit 8 is connected to the scanning circuit of the cathode ray tube, receiver 7 gives a radial modulation to the circle 12 in synchronism with the pulse transmitter 14, 15. As well known in usual distance finding apparatus, a blocking circuit may be provided for disabling the receiver 7 at times when the pulse transmitter 14 transmits a short wave train. In this way, a distance indication is obtained for each obstacle with reference to the line established by generator 26.

The mechanical arrangement of antennae 1 and 2 is rotated by the intermediary of axis 3 and a mechanical or an electrical synchronous rotation is imparted to the deflecting coil 28 in order that the light radius produced on the screen corresponds to the angle which said antennae make with a fixed index, or a definite position. It will be easily understood that any other device ensuring the freedom of the antennae with respect to the cathode ray tube but ensuring also the synchronism between the rotation of said antennae and the light radius 38 may be employed instead of the arrangement shown only for illustration purposes.

In Figure 4, is shown another modification in which the cathode ray tube used as an indicator is placed at a point remote from the radio finding apparatus proper. In the arrangement shown by way of example, the wave collectors 1, 2 rotated by the axis 3 and connected to the receiver 7 by a coupling collector or potentiometer 6, of a mechanical or electronic kind as desired, also drive on the same axis 3 the coupling transformer 29 of an induction distributor 30. Said induction distributor comprises a rotor 31 feeding two rectangular stators 32 and 33 which are preferably coils as in known distributors of this type. Thus, in the output circuits of stators 32 and 33, by suitable known circuits, ratios of high frequency voltages will be obtained in correspondence to the angular position of rotor 31.

A generator 34 is provided for supplying a high frequency voltage to the rotor of said induction distributor. The voltage from the two stators 32 and 33 is rectified by means of the symmetrical circuit 35 and amplified before being transmitted to the deflecting circuit 9 of the cathode ray tube 10. The sinusoidal ratios of the voltages generated by the induction distributor will enable, by detection and amplification of the signal issuing from the stators 32 and 33, to obtain a sharp peak voltage which when applied to the deflecting electrodes will produce light line 38. This light line has with respect to the vertical an angular position corresponding to the position of rotor 31 with respect to a fixed index. Since rotor 31 rotates with antennae 1, 2, this line gives an indication of the direction of the antenna.

By means of a switch of any suitable type 37, the voltages from the angle indicator and the voltages from the circular scanning circuit 39 radially modulated by receiver 7 will be directed alternately into the deflection circuits 9 of the cathode ray tube 10. It will thus appear in the fluorescent screen a circle 40 under the distance scale with the spot 41 visualising an obstacle situated at a given distance and the light radius 38 under the direction scale. The light radius 38 will rotate in concordance with the rotation of the collecting aerials 1, 2 and an angular position will be found at which the light trace 41 will disappear; at this instant, the angular position of the light radius 38 will correspond to the direction of the obstacle.

It is clear that in the present specification, details of structure of apparatus known per se have not been given. It is further clear that the invention is not restricted to the particular embodiments described and that numerous modifications and adaptations may be brought in without leaving the scope of the invention as defined in the appended claims.

What is claimed is:

1. A direction and distance finding equipment comprising a radio pulse generating and transmitting arrangement, a manually rotatable directive wave collector, a pulse receiving arrangement coupled with said collector for receiving pulses which are reflected back from obstacles situated within the field of said pulse transmitter, a cathode ray oscillograph indicator, means for creating on said indicator a time base reference for the distance indications, means for creating on said oscillograph a time base for the direction indications, means for alternatively applying said time reference to said indicator, means for modulating said distance base with the reflected pulses to produce fixed indications and means for modulating said direction base according to the rotation of said wave collector to produce direction indications which are displaced together with the rotation of said wave collector, the correct indication of direction being the one corresponding to the position of said wave collector for which the related distance indication disappears on said indicator.

2. A direction and distance finder equipment comprising a radio pulse generating and transmitting arrangement, a manually directive wave collector, a pulse receiving arrangement coupled with said collector for receiving pulses which are reflected back from obstacles situated within the field of said pulse transmitter, a cathode ray indicator, means for creating on said indicator a circular time base reference radially modulatable by the reflected pulses for producing the distance indications, means for creating a radial time base reference rotating together with the rotation of said wave collector, means for alternately switching said time base reference onto said indicator at a speed enabling the persistence of the both indications to be obtained, the correct indication of direction being the one corresponding to the position of said wave collector for which the related distance indication disappears on said indicator.

3. A direction and distance finding equipment comprising a radio pulse generating and transmitting arrangement, a manually directive wave collector, a pulse receiving arrangement coupled to said collector to receive and amplify pulses which are reflected back by obstacles located in the electromagnetic field of the transmitter, an oscillograph indicator, means synchronized with the pulses of said transmitter for controlling the sweep of said indicator, means for applying said received pulses to said indicator to provide, in cooperation with said sweep, simultaneous indications of the distances of said obstacles on said indicator, and means for obtaining an indication of direction corresponding respectively to each indication of distance obtained on said indicator, said last means comprising a scaled dial rotated with said wave collector in front of a fixed index, which gives the direction corresponding to a distance indication each time said wave collector is adjusted to a null receiving position for the particular received pulse producing the indication.

RENÉ JEAN HARDY.

REFERENCES CITED

The following references are of record in the file of this patent:

UNITED STATES PATENTS

| Number | Name | Date |
|---|---|---|
| 1,831,465 | Royden | Nov. 10, 1931 |
| 2,083,495 | Black et al. | June 8, 1937 |
| 2,130,912 | Tolson | Sept. 20, 1938 |
| 2,212,110 | Beuermann | Aug. 20, 1940 |
| 2,227,598 | Lyman et al. | Jan. 7, 1941 |
| 2,536,728 | De St. Exupery | Jan. 2, 1951 |

OTHER REFERENCES

Proceedings of the IRE, vol. 25, No. 12, December 1937, pages 1531 to 1541.